United States Patent
Tanaka et al.

(10) Patent No.: US 12,409,507 B2
(45) Date of Patent: Sep. 9, 2025

(54) EXPULSION DETECTION METHOD IN ELECTRIC RESISTANCE WELDING AND APPARATUS THEREFOR

(71) Applicant: MAZDA MOTOR CORPORATION, Hiroshima (JP)

(72) Inventors: Yasuyuki Tanaka, Hiroshima (JP); Akira Nawahara, Hiroshima (JP); Daisuke Nakazaki, Hiroshima (JP); Yohei Shoji, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 1029 days.

(21) Appl. No.: 17/433,025

(22) PCT Filed: Feb. 13, 2020

(86) PCT No.: PCT/JP2020/005611
§ 371 (c)(1),
(2) Date: Aug. 23, 2021

(87) PCT Pub. No.: WO2020/175158
PCT Pub. Date: Sep. 3, 2020

(65) Prior Publication Data
US 2022/0152727 A1    May 19, 2022

(30) Foreign Application Priority Data
Feb. 25, 2019   (JP) .................. 2019-031486

(51) Int. Cl.
*B23K 11/25*   (2006.01)
*B23K 11/11*   (2006.01)
(Continued)

(52) U.S. Cl.
CPC .......... *B23K 11/256* (2013.01); *B23K 11/115* (2013.01); *B23K 31/003* (2013.01); *B23K 2101/006* (2018.08)

(58) Field of Classification Search
CPC ................ B23K 11/115; B23K 11/256; B23K 2101/006; B23K 31/003
(Continued)

(56) References Cited

U.S. PATENT DOCUMENTS 4,694,135 A * 9/1987 Nagel .................. B23K 11/256
219/110
8,357,870 B1 * 1/2013 Edwards, II .......... B23K 11/115
219/78.01

FOREIGN PATENT DOCUMENTS

JP    2014-217854 A    11/2014

OTHER PUBLICATIONS

International Search Report issued in PCT/JP2020/005611; mailed Apr. 14, 2020.

* cited by examiner

*Primary Examiner* — Chris Q Liu
*Assistant Examiner* — James F Sims, III
(74) *Attorney, Agent, or Firm* — Studebaker Brackett PLLC

(57) ABSTRACT

In electric resistance welding for energizing a workpiece formed by superimposing plural metal plates, an energization resistance reduction amount between a pair of electrodes pressurizing the workpiece is detected at a specified time interval during each welding process under a specified welding condition, frequency distribution of the energization resistance reduction amount under the welding condition is calculated on the basis of data relating to the energization resistance reduction amount, the frequency distribution is fitted with a Gaussian function, and occur-
(Continued)

rence of an expulsion under the welding condition is determined on the basis of whether the fitting is statistically significant.

20 Claims, 5 Drawing Sheets

(51) Int. Cl.
*B23K 31/00* (2006.01)
*B23K 101/00* (2006.01)

(58) Field of Classification Search
USPC .......................................................... 219/91.1
See application file for complete search history.

EXPULSION DETECTION METHOD IN ELECTRIC RESISTANCE WELDING AND APPARATUS THEREFOR

TECHNICAL FIELD

The present disclosure relates to an expulsion detection method in electric resistance welding for welding plural metal plates by pressurizing a workpiece, which is formed by superimposing the plural metal plates, while energizing the workpiece by a pair of electrodes, and to an apparatus therefor.

BACKGROUND

Electric resistance welding, a representative example of which is spot welding, is frequently used for assembly of a vehicle body, and the like. In spot welding, a workpiece that is formed by superimposing plural metal plates is energized by a pair of rod-shaped electrodes while pressurizing the workpiece. Contact portions of the plural metal plates are melted by Joule heat, which is generated by this energization, and are then solidified. In this way, the plural metal plates are welded. At this time, depending on a welding condition, an expulsion phenomenon in which a molten material is scattered due to an excessive increase in a temperature of the welded portion possibly occurs. When this expulsion occurs, desired weld strength is not achieved. In addition, the scattered molten material possibly adheres around the welded portion, which requires post-cleaning.

As a preventive measure against occurrence of the expulsion, Japanese Patent Document JP-A-2014-217854 discloses that, in nut projection welding, a welding current is increased when a displacement amount of a pair of welding electrodes exceeds a specified threshold value. The occurrence of the expulsion is prevented by increasing the welding current after the projection of the nut is melted and a contact area is increased.

SUMMARY

The occurrence of the expulsion can be prevented by appropriately setting the welding condition, such as the welding current, according to the workpiece. For this purpose, as a precondition, it is necessary to detect whether the expulsion will occur or the expulsion is highly likely to occur under the current welding condition. A worker can confirm the occurrence of the expulsion by checking a welding state. However, it is not easy to visually check each of the workpieces for the occurrence of the expulsion in a production line where a large number of the workpieces is transported in a flow.

Meanwhile, by paying attention to such a phenomenon that the welded portion of the workpiece is thinned by the occurrence of the expulsion, it is considered to detect the expulsion on the basis of a reduction in a distance between the pair of electrodes during welding. However, since a welding gun is deflected at the time when the welded portion of the workpiece is pressurized, it is difficult to detect the reduction in the inter-electrode distance with a high degree of accuracy.

The present disclosure proposes a novel expulsion detection method for use in electric resistance welding and an apparatus therefor.

In order to solve the above problem, in the present disclosure, energization resistance between the electrodes, which is not influenced by the deflection of the welding gun, is adopted for the detection of the expulsion, and the expulsion is detected by a statistical method.

An expulsion detection method disclosed herein is an expulsion detection method for use in electric resistance welding for welding plural metal plates by energizing a workpiece, which is formed by superimposing the plural metal plates, by a pair of electrodes while pressurizing, and includes:

a step of detecting an energization resistance reduction amount between the pair of electrodes at a specified time interval during each welding process under a specified welding condition and accumulating data on the energization resistance reduction amount;

a step of calculating frequency distribution of the energization resistance reduction amount under the welding condition on the basis of the data; and a step of fitting the frequency distribution with a Gaussian function and determining occurrence of expulsion under the welding condition on the basis of whether the fitting is statistically significant.

An expulsion detection apparatus disclosed herein is an expulsion detection apparatus for use in electric resistance welding for welding plural metal plates by energizing a workpiece, which is formed by superimposing the plural metal plates, by a pair of electrodes while pressurizing, and includes:

data accumulation means that detects an energization resistance reduction amount between the pair of electrodes at a specified time interval during each welding process under a specified welding condition and accumulates data on the energization resistance reduction amount;

frequency distribution calculation means that calculates frequency distribution of the energization resistance reduction amount under the welding condition on the basis of the data in the data accumulation means; and determination means that fits frequency distribution, which is calculated by the frequency distribution calculation means, with a probability density function and determines occurrence of expulsion under the welding condition on the basis of whether the fitting is statistically significant.

In electric resistance welding, with the progression of welding, a temperature of the metal plate is increased, and the metal plate is gradually softened and melted. As a result, a contact area between the electrode and the metal plate is increased. In conjunction with this, energization resistance (resistance between the pair of electrodes) is reduced. During the occurrence of expulsion, the metal plate is locally thinned due to scattering of a molten material. Thus, the energization resistance reduction amount is temporarily increased. For this reason, it has been considered to monitor this energization resistance reduction amount to detect the expulsion. However, occurrence timing of the expulsion is not constant, and the energization resistance reduction amount varies. Thus, it is impossible to provide a unique threshold value.

In view of the above, according to the present disclosure, the frequency distribution of the energization resistance reduction amount is calculated, this is fitted with a Gaussian function, and the occurrence of the expulsion is determined on the basis of whether the fitting is statistically significant. That is, in normal welding without the occurrence of the expulsion, it can be assumed that the frequency distribution of the energization resistance reduction amount follows one type of Gaussian distribution. Then, when the actual frequency distribution is fitted with the Gaussian function, and when the expulsion occurs, significance of the fitting is lowered. Accordingly, in an embodiment of the expulsion detection method and the apparatus therefor that detect the occurrence of the expulsion on the basis of whether the fitting is statistically significant, the energization resistance reduction amount that is detected at the specified time interval is the energization resistance reduction amount in the specified time. In this way, it is possible to reliably grasp that the energization resistance is significantly reduced due to the occurrence of the expulsion.

In an embodiment of the disclosed expulsion detection method and the apparatus therefor, in regard to the frequency distribution, a fitting with a single Gaussian function and a fitting with two Gaussian functions are performed, and it is determined that a degree of the occurrence of the expulsion under welding conditions is high when the fitting with the two Gaussian functions is more statistically significant than the other.

Compared to a case where the expulsion does not occur, the energization resistance reduction amount is increased when the expulsion occurs. Thus, bimodality is likely to be exhibited when a histogram of the frequency distribution of the energization resistance reduction amount is created. The histogram is likely to have such a shape that has a point where the energization resistance reduction amount is relatively large and a point where the energization resistance reduction amount is small. As a result, under the welding condition in which the expulsion occurs, the fitting with the two Gaussian functions is statistically significant. Accordingly, it is possible to determine the occurrence of the expulsion on the basis of whether which of the fitting with the single Gaussian function and the fitting with the two Gaussian functions is relatively significant.

In an embodiment of the expulsion detection method and the apparatus therefor, when the fitting with the two Gaussian functions is more statistically significant than the other and a difference between average values of both of the Gaussian functions is equal to or larger than a specified value, it is determined that the energization resistance reduction amount with high probability of belonging to the Gaussian distribution (the Gaussian function) of the larger average value of the two Gaussian functions is caused by the occurrence of the expulsion.

In an embodiment of the expulsion detection method and the apparatus therefor, when the fitting with the single Gaussian function is more statistically significant than the other, or when the difference between the average values of both of the Gaussian functions is smaller than the specified value although the fitting with the two Gaussian functions is more statistically significant than the other, presence or absence of the occurrence of the expulsion is determined by a chi-square test.

That is, a chi-square value is calculated for each of the energization resistance reduction amounts that are detected at the specified time intervals, and it is determined that the energization resistance reduction amount related to the larger chi-square value than the specified threshold value determined by chi-square distribution is caused by the occurrence of the expulsion. Since such a determination is the expulsion determination based on a chi-square statistic, determination accuracy is improved.

According to the present disclosure, the energization resistance reduction amount between the pair of electrodes is detected at the specified time interval during each of the welding processes under the specified welding condition, the frequency distribution of the energization resistance reduction amount is calculated on the basis of data on the energization resistance reduction amount, the frequency distribution is fitted with the Gaussian function, and the occurrence of the expulsion under the welding condition is determined on the basis of whether the fitting is statistically significant. Therefore, it is possible to detect the occurrence of the expulsion with a high degree of accuracy without being influenced by disturbance such as deflection of a welding gun during welding.

DETAILED DESCRIPTION

A description will hereinafter be made on a mode for carrying out the present disclosure with reference to the drawings. The following description on a preferred embodiment is essentially and merely illustrative and thus is not intended to limit the present disclosure, application subjects thereof, and application thereof.

Figure 1:
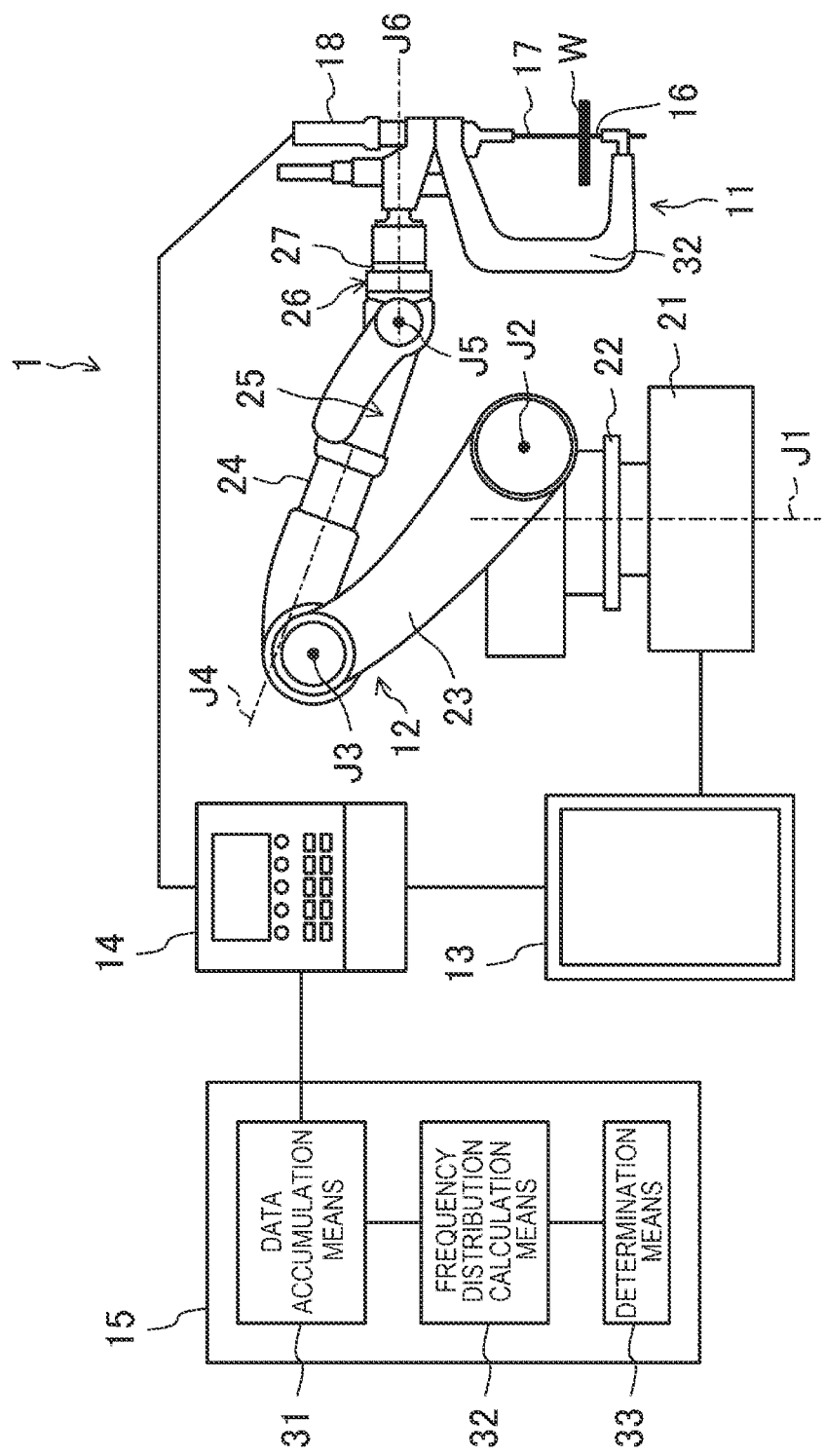
FIG. 1 is a diagrammatic view illustrating the configuration of an expulsion detection apparatus in an electric resistance welding system according to the present disclosure.

A spot welding system 1 as an electric resistance welding system illustrated in FIG. 1 is arranged in a production line, for example, and energizes a workpiece W, which is formed by superimposing plural metal plates, by a pair of electrodes while pressurizing the workpiece W, and thereby welds the plural metal plates.

The spot welding system 1 includes a welding gun 11, an arm-type robot 12 that holds the welding gun 11, a robot controller 13, and a welding controller (timer) 14. The robot controller 13 controls actuation of the welding gun 11 and actuation of the robot 12. The welding controller 14 controls the duration of application of a welding current and a magnitude of the current, and monitors the duration of the application of the current and the magnitude of the applied current. An expulsion detection apparatus 15 is connected to this welding controller 14. The expulsion detection apparatus 15 detects occurrence of expulsion, in which a molten material is scattered during welding, on the basis of data on an energization resistance reduction amount, which will be described below.

The welding gun 11 is a C-type welding gun and includes an arm 16, a pair of opposing electrodes (a fixed electrode 17 and a movable electrode 18) provided to the arm 16, and servomotor 19 that drives the movable electrode 18. The servomotor 19 is controlled by the robot controller 13.

The robot 12 is an articulated robot having six joint axes J1 to J6. This robot 12 includes, on a base 21, a turning section 22, a lower arm 23, an upper arm 24, first to third tip sections 25 to 27, and the like, and these are configured to be rotatable with each other. The robot 12 includes servomotors, each of which drives respective one of the components around respective one of the joint axes J1 to J6. These servomotors are controlled by the robot controller 13.

In a state where the workpiece W is held between the electrodes 17, 18 with a prescribed welding pressure, the welding controller 14 applies the controlled welding current from the electrodes 17, 18 to the workpiece on the basis of a welding condition and a welding command received from the robot controller 13. After the application of the current, a welding completion signal is sent from the welding controller 14 to the robot controller 13.

The expulsion detection apparatus 15 includes data accumulation means 31, frequency distribution calculation means 32, and determination means 33, and is constructed of an electronic circuit including a microcomputer.

Figure 2:
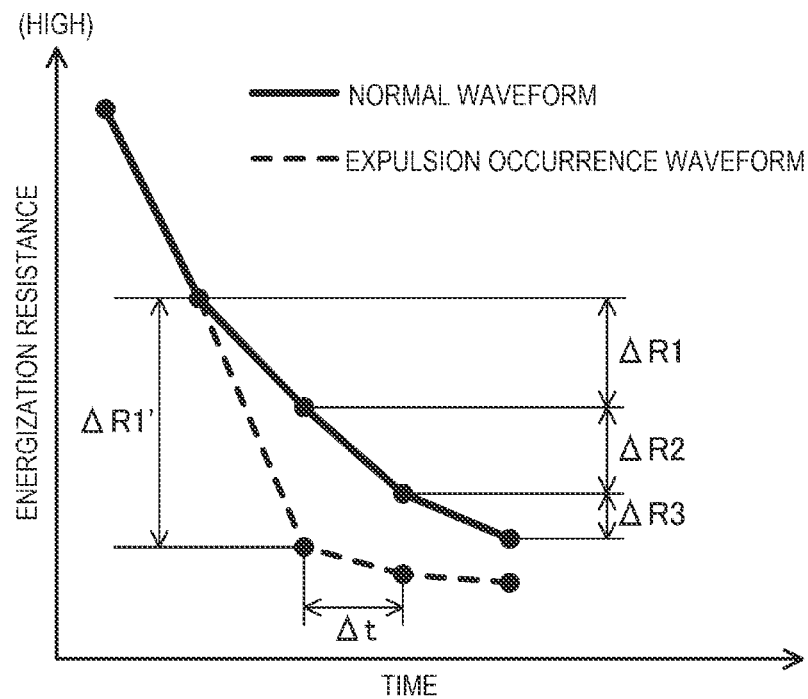
FIG. 2 is a graph schematically illustrating changes in energization resistance during normal welding and during occurrence of expulsion.

The data accumulation means 31 calculates chronological change data of energization resistance between the electrodes 17, 18 on the basis of a voltage and the welding current, which are controlled by the welding controller 14, between the electrodes 17, 18 during welding, detects the energization resistance reduction amount in a specified short time at specified time intervals, and accumulates the data on the energization resistance reduction amount. In summary, as illustrated in FIG. 2, the data accumulation means 31 detects the reduction amount since the energization resistance is reduced with progression of welding.

In this embodiment, an energization resistance reduction amount $\Delta R$ ($\Delta R1$, $\Delta R2$, $\Delta R3$, ...) is calculated per specified time $\Delta t$ during welding on the basis of a resistance value before and after the specified time, and data on the energization resistance reduction amount $\Delta R$ in each welding process under the same welding condition is accumulated. Such data is obtained under various welding conditions. Here, in regard to detection of the energization resistance reduction amount $\Delta R$, the energization resistance is rapidly reduced due to contact resistance at an initial stage of energization by the electrodes 17, 18. Thus, it is preferred to obtain the data on the energization resistance reduction amount $\Delta R$ from a time point at which the reduction in the energization resistance is stabilized after a lapse of several tens of msec from the initiation of the energization.

Figure 3:
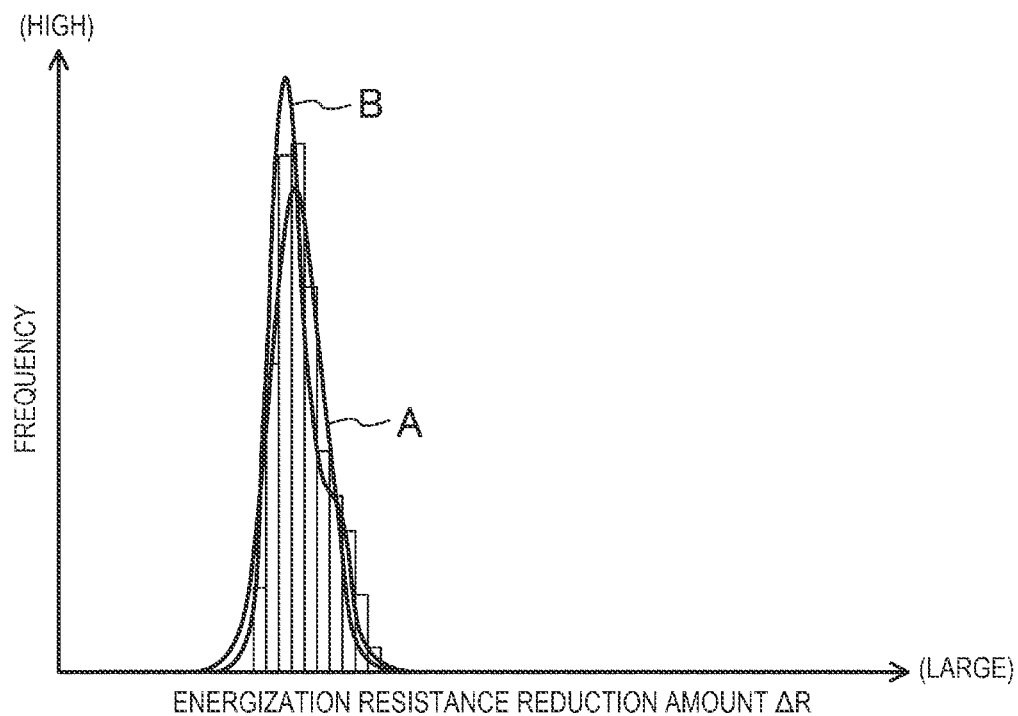
FIG. 3 is a graph illustrating an example of a histogram of an energization resistance reduction amount.

The frequency distribution calculation means 32 calculates frequency distribution of the energization resistance reduction amount $\Delta R$ under the welding condition on the basis of the data in the data accumulation means 31. FIG. 3 illustrates an example of a histogram as the frequency distribution. The determination means 33 determines occurrence of the expulsion under the welding condition by a statistical method on the basis of the frequency distribution.

Next, a specific description will be made of an expulsion detection method by the expulsion detection apparatus 15 with reference to FIG. 3 to FIG. 7.

Figure 4:
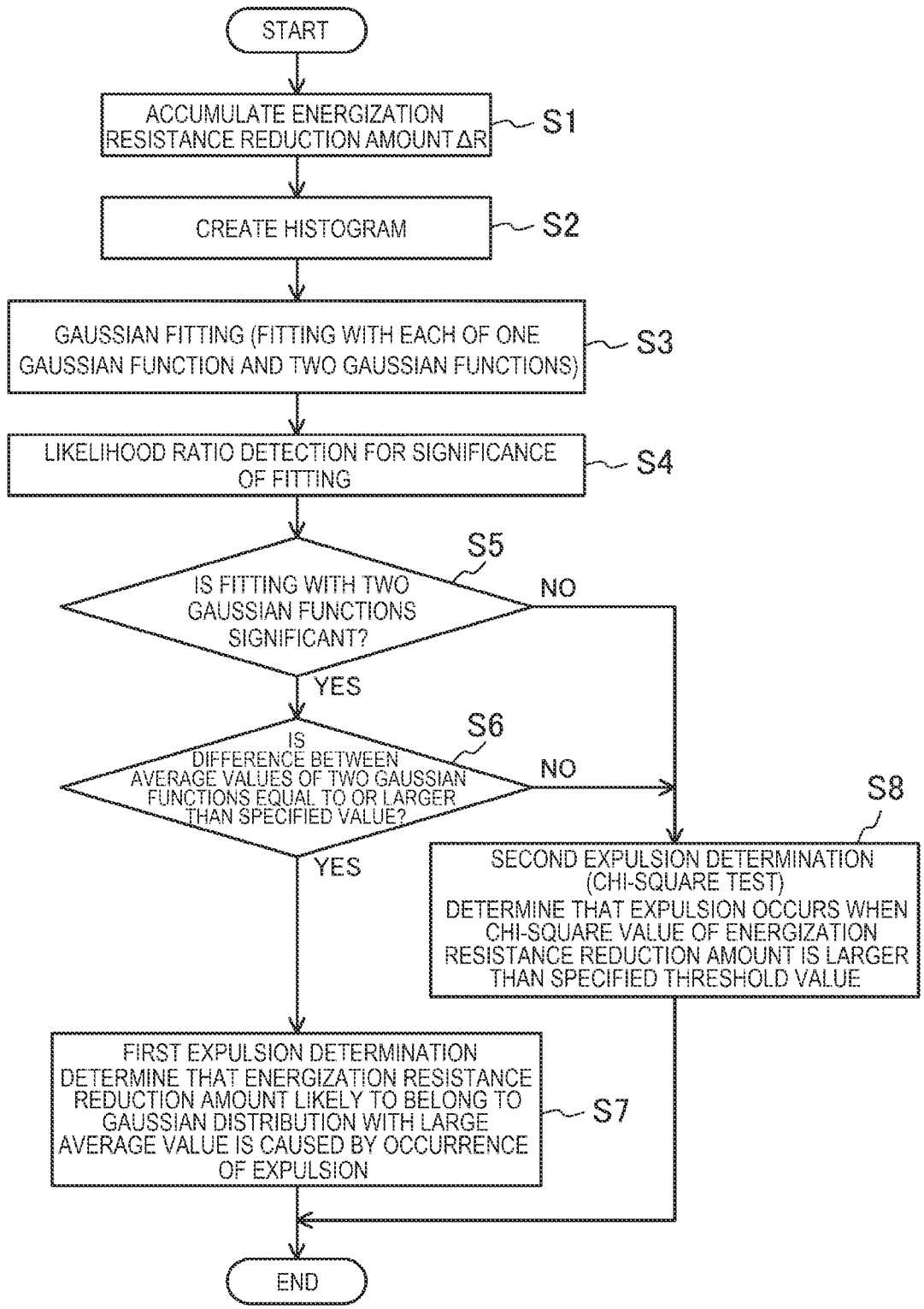
FIG. 4 is a flow chart illustrating a method of detecting the expulsion.

As illustrated in FIG. 4, the expulsion detection method includes processing in step S1 by the data accumulation means 31, processing in step S2 by the frequency distribution calculation means 32, and processing in steps S3 to S8 by the determination means 33.

In step S1, the energization resistance reduction amounts $\Delta R$ in the welding processes under the same welding condition are accumulated.

In step S2, a histogram, the example of which is illustrated in FIG. 3, and which has the energization resistance reduction amount as a horizontal axis and frequency as a vertical axis, is created on the basis of the accumulated data on the energization resistance reduction amounts $\Delta$.

In step S3, Gaussian fitting is performed on the histogram. That is, fitting GMM1 with a single Gaussian function and fitting GMM2 with the two Gaussian functions are performed. In the example illustrated in FIG. 3, A represents a fitting Gaussian distribution curve with the single Gaussian function, and B represents a fitting Gaussian distribution curve with the two Gaussian functions.

In step S4, a likelihood ratio test is performed to see which of GMM1, GMM2 models favorably recreates the data distribution. That is, likelihood ratios $-2 \log(\text{deltaL})$ of two models are calculated from $-2 \log(L)$ of GMM1 and $-2 \log(L)$ of GMM2, each of which is obtained by multiplying a maximum logarithmic likelihood ratio by $-2$, and a parameter of the maximum logarithmic likelihood ratio is estimated in the fitting.

In the example illustrated in FIG. 3, such a result that $-2 \log(L)$ of GMM2 has a smaller value than $-2 \log(L)$ of GMM1. Thus, the model GMM2 with the two Gaussian functions fits better. The likelihood ratios $-2 \log(\text{deltaL})$ of the GMM1 model and the GMM2 model are approximately 285. In this case, the likelihood ratio approximately follows chi-square distribution of three-degree-of-freedom. Accordingly, it is possible to calculate probability p value (p-value) with which the likelihood ratio $-2 \log(\text{deltaL})$ obtains such a value. In the case of this example, due to the result that the p value is smaller than a specified significant level $1 \times 10^{-4}$. Thus, compared to a model with the single Gaussian function, the model with the two Gaussian functions reproduces the data distribution in a statistically significant manner.

In following step S5, if it is determined that the fitting with the two Gaussian functions is statistically significant, the processing proceeds to step S6, and it is determined whether a difference between average values $\mu 1$, $\mu 2$ of the two Gaussian functions is equal to or larger than a specified value.

Figure 5:
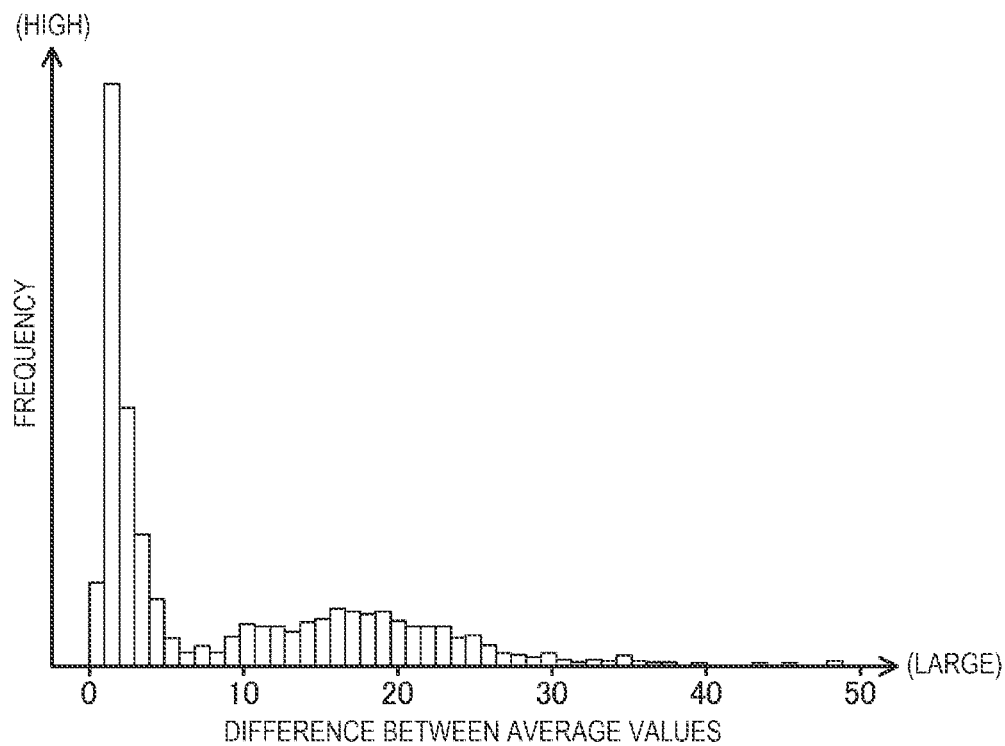
FIG. 5 is a graph illustrating a histogram of a difference between average values of two Gaussian functions related to fitting.

As described above, in the case where the expulsion occurs, bimodality is likely to be exhibited when the histogram of the frequency distribution of the energization resistance reduction amount is created. Thus, the specified value can appropriately be set on the basis of a difference between two peak positions thereof. Alternatively, as illustrated in FIG. 5, when a histogram of the difference between the peak positions, that is, the difference between the average values $\mu 1$, $\mu 2$ is created, a bimodal graph having a trough of the difference near "8" is generated. In this case, a value near 7 to 9 can preferably be adopted as the specified value.

If the difference between the average values $\mu 1$, $\mu 2$ of the two Gaussian functions is equal to or larger than the specified value, the processing proceeds to first expulsion determination in step 7. That is, it is determined that the energization resistance reduction amount with high probability of belonging to the Gaussian distribution with the larger average value is caused by the occurrence of the expulsion.

Figure 6:
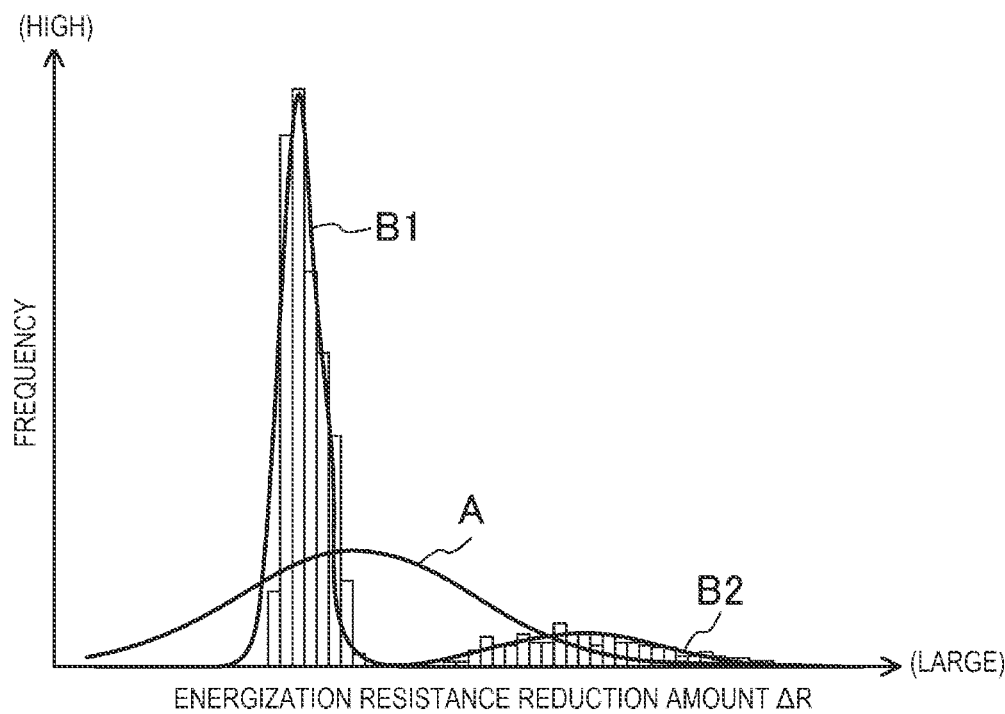
FIG. 6 is a graph illustrating another example of the histogram of the energization resistance reduction amount.

FIG. 6 illustrates a histogram and the fitting in this case. In this example, the difference between the average values $\mu 1$, $\mu 2$ is approximately 23, and two independent Gaussian distribution curves B1, B2 are obtained. It is determined that the energization resistance reduction amount $\Delta$ belonging to the Gaussian distribution (the Gaussian function) with the larger average value (on a right side in FIG. 6) is generated by the occurrence of the expulsion.

Figure 7:
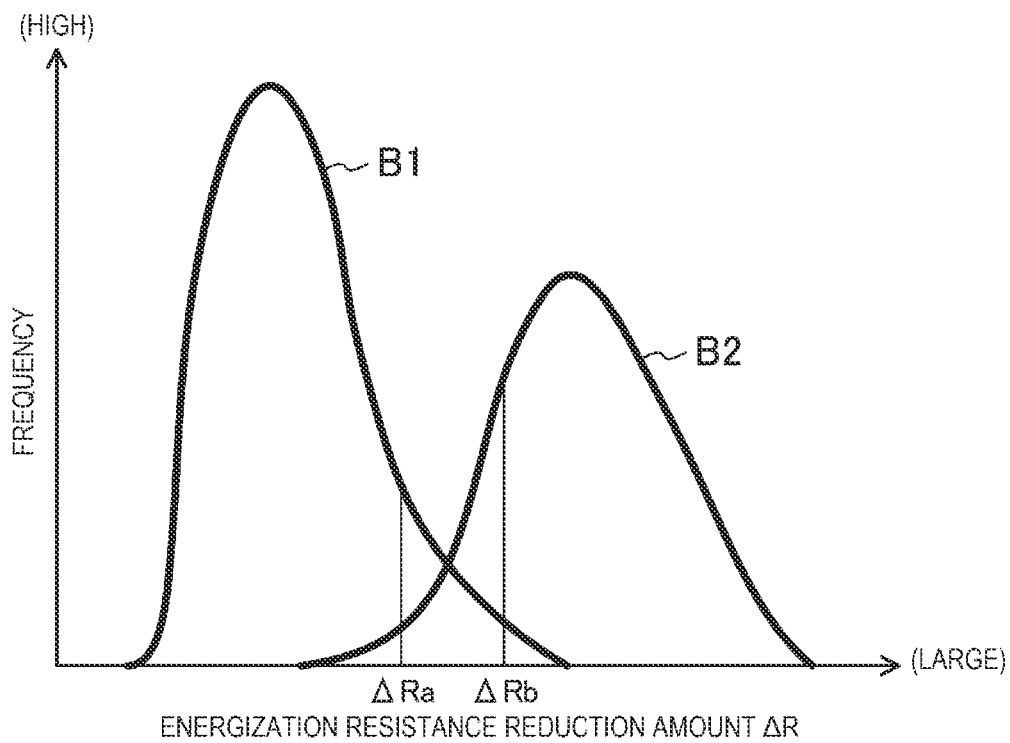
FIG. 7 is a graph for illustrating partial overlapping of the two Gaussian functions related to fitting.

As illustrated in FIG. 7, when the two Gaussian distribution curves B1, B2 partially overlap each other, it is determined whether the energization resistance reduction amount is generated by the occurrence of the expulsion on the basis of which Gaussian distribution the energization resistance reduction amount is likely to belong to. For example, since the energization resistance reduction amount ΔRa has higher probability of belonging to B1 than B2, it is determined that the energization resistance is reduced by normal welding. On the contrary, since the energization resistance reduction amount Δb has the higher probability of belonging to B2 than B1, it is determined that the energization resistance is reduced by the occurrence of the expulsion.

On the other hand, if it is determined "No" (the fitting with the single Gaussian function is significant) in step S5, or if it is determined "No" in step S6 (the difference between the average values of the two Gaussian functions is lower than the specified value (the case in FIG. 3; such a difference between the average values is approximately 3.6), the processing proceeds to second expulsion determination in step S8.

The second expulsion determination is the expulsion determination by a chi-square test, and the chi-square value of each resistance waveform is calculated. Here, it is assumed that welding is performed for an energization time of a cycle of n=20, for example. First, the energization resistance reduction amount ΔR1 in the first cycle is calculated by using all pieces of the chronological change data of the energization resistance (for example, 2000 pieces) under the welding condition. Then, a sample average $ΔR1\_ave$ and dispersion $ΔR1\_\sigma$ of the samples are calculated, and $(ΔR1i - ΔR1\_ave)^2/ΔR1\_\sigma^2$ is calculated. The same calculations are performed for ΔR2, ΔR3, . . . , Δn. In the end, these are added to calculate a chi-square statistic from the single piece of the resistance waveform data.

Figure 8:
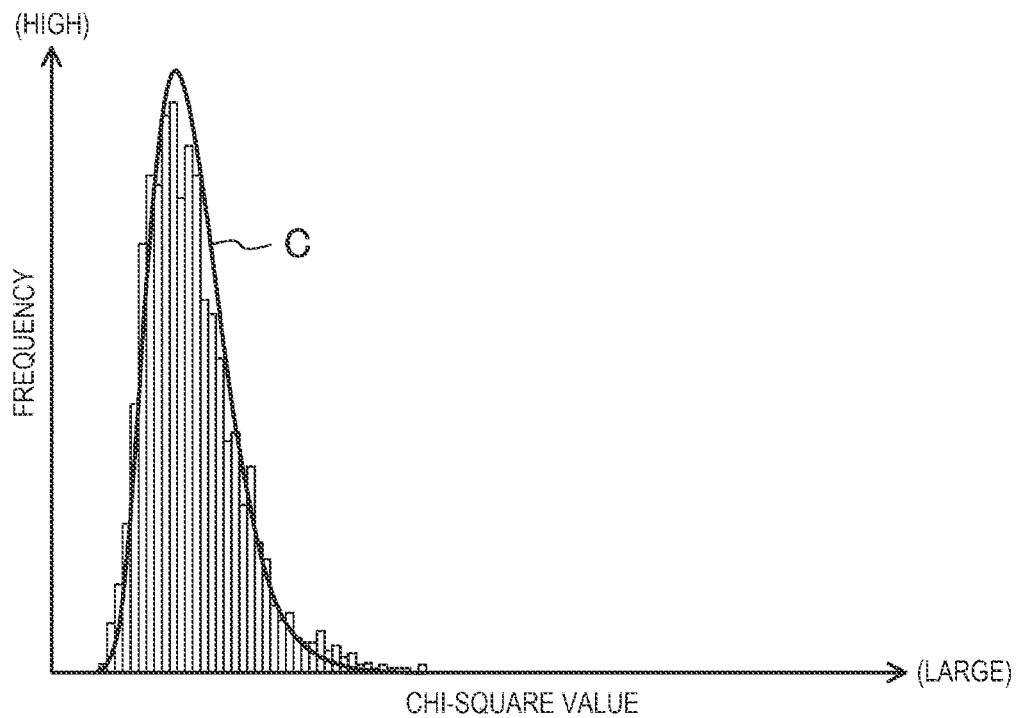
FIG. 8 is a graph illustrating an example of a histogram of a chi-square value.

FIG. 8 illustrates a histogram of the obtained chi-square value, and C represents a theoretical curve of the chi-square distribution with twenty-degree-of-freedom. In a case of FIG. 8, a value at a percentage point of 99.99% is approximately 52.4, and the resistance waveform that has the chi-square value exceeding this threshold value is determined as the expulsion.

As described herein, according to this embodiment, the occurrence of the expulsion is statistically detected from the data on an energization resistance reduction amount during welding. Thus, it is possible to detect the occurrence of the expulsion with a high degree of accuracy without being influenced by a disturbance such as deflection of the welding gun during welding.

The invention claimed is:

1. An expulsion detection method in electric resistance welding for welding plural metal plates by energizing a workpiece, which is formed by superimposing the plural metal plates, by a pair of electrodes while pressurizing, the expulsion detection method in the electric resistance welding comprising:
 a step of detecting an energization resistance reduction amount between the pair of electrodes at a specified time interval during each welding process under a specified welding condition and accumulating data on said energization resistance reduction amount;
 a step of calculating a frequency distribution of the energization resistance reduction amount under said welding condition on the basis of the data; and
 a step of fitting the frequency distribution with a Gaussian function and determining occurrence of an expulsion under said welding condition based on said fitting.

2. The expulsion detection method in electric resistance welding according to claim 1,
 wherein the energization resistance reduction amount that is detected at the specified time interval is an energization resistance reduction amount in said specified time.

3. The expulsion detection method in electric resistance welding according to claim 2,
 wherein when fitting the frequency distribution, a fitting with a single Gaussian function and a fitting with two Gaussian functions are performed, and a degree of the occurrence of the expulsion under said welding condition is determined to be high based on a comparison of the fitting with the single Gaussian function and the fitting with the two Gaussian functions.

4. The expulsion detection method in electric resistance welding according to claim 3,
 wherein when the comparison of the fitting with the single Gaussian function and the fitting with the two Gaussian functions determines the fitting with the two Gaussian functions is statistically significant and a difference between average values of both of said Gaussian functions of the fitting with the two Gaussian functions is equal to or larger than a specified value, a determination is made that the energization resistance reduction amount with high probability of belonging to the Gaussian distribution of the larger average value of said two Gaussian functions of the fitting with the two Gaussian functions is caused by the occurrence of the expulsion.

5. The expulsion detection method in electric resistance welding according to claim 4,
 wherein, when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, a chi-square value of each of energization resistance reduction amounts detected at the specified time intervals is calculated, and a determination is made that the energization resistance reduction amount related to the larger chi-square value than a specified threshold value determined by a chi-square distribution is caused by the occurrence of the expulsion.

6. The expulsion detection method in electric resistance welding according to claim 3,
 wherein, when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, a chi-square value of each of energization resistance reduction amounts detected at the specified time intervals is calculated, and a determination is made that the energization resistance reduction amount related to the larger chi-square value than a specified threshold value determined by a chi-square distribution is caused by the occurrence of the expulsion.

7. The expulsion detection method in electric resistance welding according to claim 1,
 wherein when fitting the frequency distribution, a fitting with a single Gaussian function and a fitting with two Gaussian functions are performed, and a degree of the occurrence of the expulsion under said welding condition is determined to be high based on a comparison of the fitting with the single Gaussian function and the fitting with the two Gaussian functions.

8. The expulsion detection method in electric resistance welding according to claim 7, wherein when the comparison of the fitting with the single Gaussian function and the fitting with the two Gaussian functions determines the fitting with the two Gaussian functions is statistically significant and a difference between average values of both of said Gaussian functions of the fitting with the two Gaussian functions is equal to or larger than a specified value, a determination is made that the energization resistance reduction amount with high probability of belonging to the Gaussian distribution of the larger average value of said two Gaussian functions of the fitting with the two Gaussian functions is caused by the occurrence of the expulsion.

9. The expulsion detection method in electric resistance welding according to claim 8, wherein, when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, a chi-square value of each of energization resistance reduction amounts detected at the specified time intervals is calculated, and a determination is made that the energization resistance reduction amount related to the larger chi-square value than a specified threshold value determined by a chi-square distribution is caused by the occurrence of the expulsion.

10. The expulsion detection method in electric resistance welding according to claim 7, wherein, when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, a chi-square value of each of energization resistance reduction amounts detected at the specified time intervals is calculated, and a determination is made that the energization resistance reduction amount related to the larger chi-square value than a specified threshold value determined by a chi-square distribution is caused by the occurrence of the expulsion.

11. An expulsion detection apparatus in electric resistance welding for welding plural metal plates by energizing a workpiece, which is formed by superimposing the plural metal plates, by a pair of electrodes while pressurizing, the expulsion detection apparatus in the electric resistance welding comprising:

data accumulation means that detects an energization resistance reduction amount between the pair of electrodes at a specified time interval during each welding process under a specified welding condition and accumulates data on said energization resistance reduction amount;

frequency distribution calculation means that calculates frequency distribution of the energization resistance reduction amount under said welding condition on the basis of the data in the data accumulation means; and determination means that fits frequency distribution, which is calculated by the frequency distribution calculation means, with a Gaussian function and determines occurrence of expulsion under said welding condition based on said fitting.

12. The expulsion detection apparatus in electric resistance welding according to claim 11, wherein the energization resistance reduction amount that is detected at the specified time interval is an energization resistance reduction amount in said specified time.

13. The expulsion detection apparatus in electric resistance welding according to claim 12, wherein when fitting the frequency distribution, the determination means performs the fitting with a single Gaussian function and performs the fitting with two Gaussian functions, and determines that a degree of the occurrence of the expulsion under said welding condition is high based on a comparison of the fitting with the two Gaussian functions and the fitting with the single Gaussian function.

14. The expulsion detection apparatus in electric resistance welding according to claim 13, wherein when the comparison of the fitting with the single Gaussian function and the fitting with the two Gaussian functions determines the fitting with the two Gaussian functions is statistically significant and a difference between average values of both of said Gaussian functions of the fitting with the two Gaussian functions is equal to or larger than a specified value, the determination means determines that the energization resistance reduction amount with a high probability of belonging to the Gaussian distribution of the larger average value of said two Gaussian functions of the fitting with the two Gaussian functions is caused by the occurrence of the expulsion.

15. The expulsion detection apparatus in electric resistance welding according to claim 14, wherein when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, the determination means calculates a chi-square value of each of energization resistance reduction amounts that are detected from the data at the specified time intervals, and determines that the energization resistance reduction amount related to the larger chi-square value than a specified threshold value determined by a chi-square distribution is caused by the occurrence of the expulsion.

16. The expulsion detection apparatus in electric resistance welding according to claim 13, wherein when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, the determination means calculates a chi-square value of each of energization resistance reduction amounts that are detected from the data at the specified time intervals, and determines that the energization resistance reduction amount related to the larger chi-square value than a specified threshold value determined by a chi-square distribution is caused by the occurrence of the expulsion.

17. The expulsion detection apparatus in electric resistance welding according to claim 11,
wherein when fitting the frequency distribution, the determination means performs the fitting with a single Gaussian function and performs the fitting with two Gaussian functions, and determines that a degree of the occurrence of the expulsion under said welding condition is high based on a comparison of the fitting with the two Gaussian functions and the fitting with the single Gaussian function.

18. The expulsion detection apparatus in electric resistance welding according to claim 17,
wherein when the comparison of the fitting with the single Gaussian function and the fitting with the two Gaussian functions determines the fitting with the two Gaussian functions is statistically significant and a difference between average values of both of said Gaussian functions of the fitting with the two Gaussian functions is equal to or larger than a specified value, the determination means determines that the energization resistance reduction amount with a high probability of belonging to the Gaussian distribution of the larger average value of said two Gaussian functions of the fitting with the two Gaussian functions is caused by the occurrence of the expulsion.

19. The expulsion detection apparatus in electric resistance welding according to claim 18,
wherein when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, the determination means calculates a chi-square value of each of energization resistance reduction amounts that are detected from the data at the specified time intervals, and determines that the energization resistance reduction amount related to the larger chi-square value than a specified threshold value determined by a chi-square distribution is caused by the occurrence of the expulsion.

20. The expulsion detection apparatus in electric resistance welding according to claim 17,
wherein when the comparison of the fitting with the single Gaussian function and the fitting with the two Gaussian functions determines the fitting with the single Gaussian function is statistically significant, or when the difference between the average values of both of said Gaussian functions of the fitting with the two Gaussian functions is smaller than the specified value although the fitting with the two Gaussian functions is statistically significant, the determination means calculates a chi-square value of each of energization resistance reduction amounts that are detected from the data at the specified time intervals, and determines that the energization resistance reduction amount related to the larger chi-square value than a specified threshold value determined by a chi-square distribution is caused by the occurrence of the expulsion.

* * * * *